(12) United States Patent
Dean-Hendricks et al.

(10) Patent No.: US 9,804,611 B2
(45) Date of Patent: Oct. 31, 2017

(54) HVAC CONTROLLER WITH VENTILATION BOOST CONTROL

(75) Inventors: Barbara Dean-Hendricks, Woodbury, MN (US); Joshua Jacque Edberg, Maple Grove, MN (US); Steven Hoglund, Minneapolis, MN (US); Steve C. Nichols, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 596 days.

(21) Appl. No.: 13/396,337

(22) Filed: Feb. 14, 2012

(65) Prior Publication Data

US 2013/0211600 A1     Aug. 15, 2013

(51) Int. Cl.
G05D 23/24     (2006.01)
G05D 23/19     (2006.01)
F24F 11/00     (2006.01)

(52) U.S. Cl.
CPC ...... *G05D 23/1932* (2013.01); *F24F 11/0001* (2013.01); *F24F 11/006* (2013.01); *F24F 11/0086* (2013.01); *G05D 23/1902* (2013.01); *F24F 2011/0067* (2013.01); *F24F 2011/0068* (2013.01); *F24F 2011/0091* (2013.01)

(58) Field of Classification Search
CPC ...... F24F 11/00; F24F 11/006; F24F 11/0001; F24F 11/0086; F24F 2011/0091; F24F 2011/0068; F24F 2011/0067; G05D 23/1932; G05D 23/1902
USPC .............................. 700/278; 454/239; 310/62
See application file for complete search history.

(56) References Cited

U.S. PATENT DOCUMENTS

| | | | |
|---|---|---|---|
| 7,579,956 B2 | 8/2009 | Chapman et al. | |
| 7,832,465 B2 | 11/2010 | Zou et al. | |
| 2003/0216837 A1* | 11/2003 | Reich et al. | 700/276 |
| 2004/0236471 A1* | 11/2004 | Poth | F24F 11/0086 700/276 |
| 2005/0156052 A1* | 7/2005 | Bartlett et al. | 236/49.3 |
| 2005/0270151 A1* | 12/2005 | Winick | 340/539.1 |
| 2006/0158051 A1* | 7/2006 | Bartlett et al. | 310/62 |
| 2006/0200253 A1* | 9/2006 | Hoffberg et al. | 700/19 |
| 2007/0012052 A1* | 1/2007 | Butler et al. | 62/181 |

(Continued)

FOREIGN PATENT DOCUMENTS

WO     2008064179     5/2009

OTHER PUBLICATIONS

Honeywell, Date: 2010, https://www.forwardthinking.honeywell.com/related_links/ventilation/truebreeze/69-2480EF_A.pdf pp. 9,12, and 19.*

(Continued)

*Primary Examiner* — Mohammad Ali
*Assistant Examiner* — Bernard G Lindsay
(74) *Attorney, Agent, or Firm* — Seager, Tufte & Wickhem, LLP

(57) ABSTRACT

A Heating, Ventilation, and/or Air Conditioning (HVAC) controller, such as a thermostat, is configured to receive and accept one or more requests for a temporary boost in ventilation. The requests may be received from one or more remotely located ventilation boost control units located throughout the building, and/or through a user interface of the HVAC controller itself. In some cases, the HVAC controller may be configured to coordinate multiple requests for ventilation, and adjust the ventilation time as appropriate.

6 Claims, 14 Drawing Sheets

(56) References Cited

U.S. PATENT DOCUMENTS

| | | | |
|---|---|---|---|
| 2007/0130969 A1* | 6/2007 | Peterson et al. | 62/178 |
| 2007/0278320 A1* | 12/2007 | Lunacek et al. | 236/94 |
| 2008/0096482 A1* | 4/2008 | Wettergren | F24F 11/0001 454/256 |
| 2008/0121729 A1* | 5/2008 | Gray | F24F 11/0086 236/51 |
| 2009/0075581 A1* | 3/2009 | Van Heeswijk et al. | 454/239 |
| 2009/0171862 A1* | 7/2009 | Harrod et al. | 705/412 |
| 2010/0044448 A1* | 2/2010 | Wolfson | F24F 11/0001 236/49.3 |
| 2010/0070089 A1* | 3/2010 | Harrod et al. | 700/277 |
| 2010/0076605 A1* | 3/2010 | Harrod et al. | 700/276 |
| 2010/0106334 A1* | 4/2010 | Grohman et al. | 700/278 |
| 2010/0106809 A1* | 4/2010 | Grohman | 709/220 |
| 2010/0163633 A1* | 7/2010 | Barrett et al. | 236/49.3 |
| 2010/0292849 A1* | 11/2010 | Peterson et al. | 700/278 |
| 2011/0031322 A1* | 2/2011 | Zou et al. | 236/1 B |
| 2011/0061014 A1* | 3/2011 | Frader-Thompson et al. | 715/771 |
| 2011/0098867 A1* | 4/2011 | Jonsson | G01D 4/002 700/295 |
| 2011/0113120 A1* | 5/2011 | Johnson et al. | 709/218 |
| 2011/0167110 A1* | 7/2011 | Hoffberg et al. | 709/203 |
| 2011/0172828 A1* | 7/2011 | Schmidt | F24F 5/0042 700/276 |
| 2012/0091804 A1* | 4/2012 | Altonen et al. | 307/31 |
| 2012/0123594 A1* | 5/2012 | Finch et al. | 700/278 |
| 2012/0295532 A1* | 11/2012 | Bagwell | F24F 13/26 454/237 |
| 2013/0325997 A1* | 12/2013 | Higgins | H04L 41/0893 709/208 |

OTHER PUBLICATIONS

Peffer 'How people use thermostats in homes: A review', Building and Environment 46, pp. 2529-2541 (2011).*
'CM907 User Guide', Honeywell, 2005, p. 10.*
TH8320ZW1000 Operating Manual, Honeywell, 2011, p. 7.*
Honeywell, "ERV/HRV Ventilation Systems Professional Installation Guide," Honeywell International Inc. 66 pages, 2010. 69-2480EF-01.
Honeywell, "Prestige® THX9321/9421 Touch Screen Thermostat Operating Manual," Honeywell International Inc., 38 pages, Downloaded Jul. 6,2011, 69-2493EFS A.ind 2.
Carrie Ann Brown, "Multizone Register Controlled Residential Heating: Optimized for Energy Use and Comfort " University of California, Berkeley 60 pages, Dowloaded Nov. 2011.
U.S. Department of Energy, "Techonology Fact Sheet: Whole-House Ventilation systems, Improved control of air quality," U.S. Department of Energy Office of Energy Efficiency and Renewable Energy, 6 pages, Downloaded Aug. 2012. DOE/GO-102002-0778. Building Technologies Program.
Honeywell, "A Guide to Understanding Air Quality Solutions," Honeywell International Inc., 28 pages, Downloaded Aug. 2012. 50-9767 PM.
Watts, "Application of Multizone HVAC Control Using Wireless Sensor Networks and Actuating Vent Register," Department of Mechanical Engineering, University of California, Berkeley, 9 pages, Downloaded Nov. 2011.

* cited by examiner

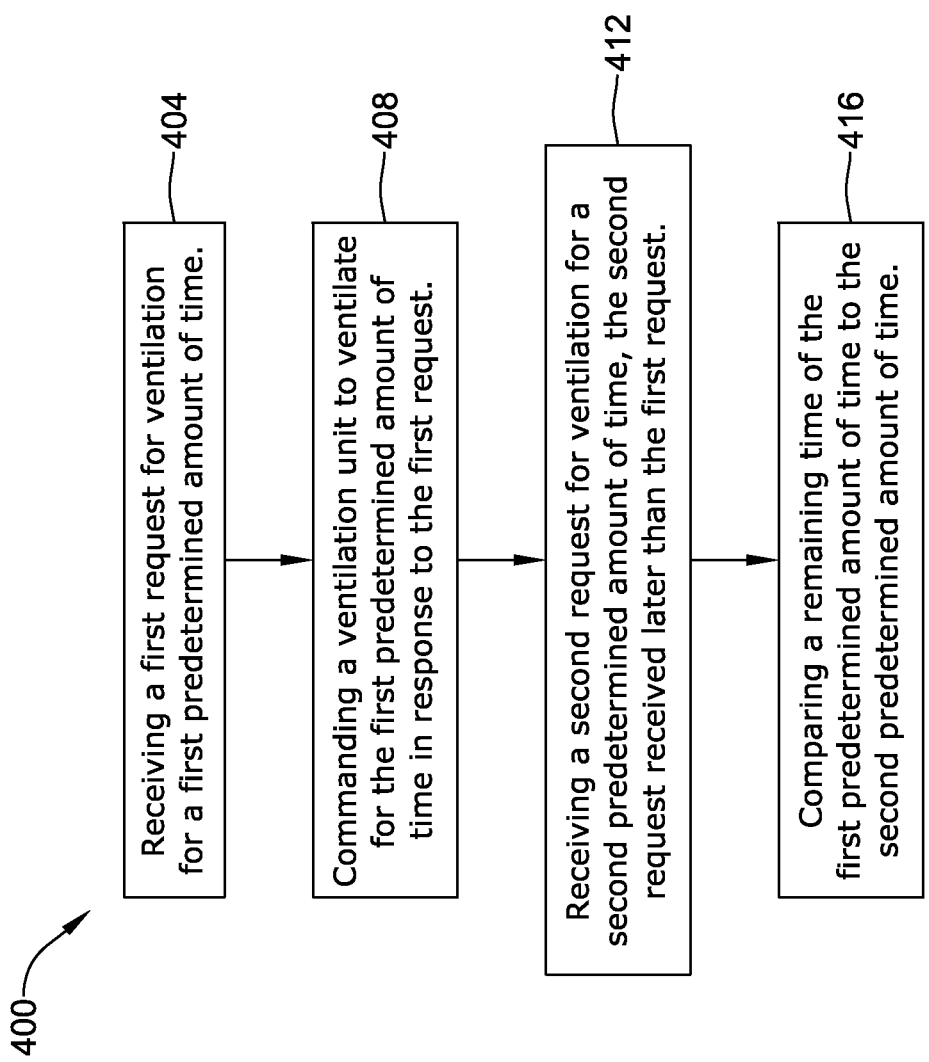

HVAC CONTROLLER WITH VENTILATION BOOST CONTROL

TECHNICAL FIELD

The present disclosure relates generally to HVAC systems, and more particularly, to controllers that may be used for controlling HVAC systems.

BACKGROUND

Heating, ventilation, and/or air conditioning (HVAC) systems are used to control the comfort level within a building or other structure. Some HVAC systems include ventilation units that are configured to help ventilate the building. Some ventilation units draw outside air into the building and at the same time expel inside air. In some cases, a heat exchanger is provided to exchange heat between the outgoing inside air and the incoming outside air. Many ventilation units include a ventilation controller that has a number of ventilation modes. For example, a ventilation controller may include an intermittent ventilation mode that, when activated, ventilates for 20 minutes of every hour. In another example, a ventilation controller may have a constant ventilation mode that, when activated, ventilates constantly. In some cases, ventilation units have different speed settings, which provide different levels of ventilation to the building.

Some ventilation units include a number of wired ventilation boost buttons placed about the building. The wired ventilation boost buttons are often placed in areas of likely higher indoor air contamination, such as in the kitchen, laundry room, bathroom and/or other locations. When a user desires an extra "boost" of ventilation, the user typically activates one of the ventilation boost buttons, and in response, the ventilation controller activates the ventilation unit, often for a fixed period of time (e.g. 5 minutes). In some cases, if the user wants to terminate an additional "boost" of ventilation, the user needs to go back to the original ventilation boost button and cancel the ventilation boost request.

SUMMARY

This disclosure relates generally to HVAC systems, and more particularly, to HVAC controllers that may be used for controlling HVAC systems. In some cases, the HVAC system may include a building controller (e.g. a thermostat) and a ventilation unit having a ventilation controller.

In one illustrative example, a thermostat configured to control one or more components of an HVAC system of a building may include a user interface including a display, a memory, a temperature sensor, an I/O block for sending and/or receiving signals to and/or from one or more components of the HVAC system including one or more wireless ventilation boost control units, and a controller. The controller may be coupled to the user interface, the memory, the temperature sensor, and the I/O block, and may be configured to read a temperature value via the temperature sensor and to control one or more components of an HVAC system in order to maintain a desired temperature set point in the building. Additionally, the controller may be configured to wirelessly receive a signal indicative of a request for ventilation for a predetermined amount of time from the one or more wireless ventilation boost control units and, in response, to send one or more commands to the ventilation controller of the ventilation unit in order to ventilate the building for a ventilation time, wherein the ventilation time is based, at least in part, on the predetermined amount of time. In some cases, the controller may be configured to coordinate competing requests for ventilation.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which:

FIG. 14 is a flow chart showing an illustrative method that may be used by the HVAC controllers of FIGS. 2 and 3 when interacting with the ventilation boost control unit of FIGS. 4-6.

Figure 1:
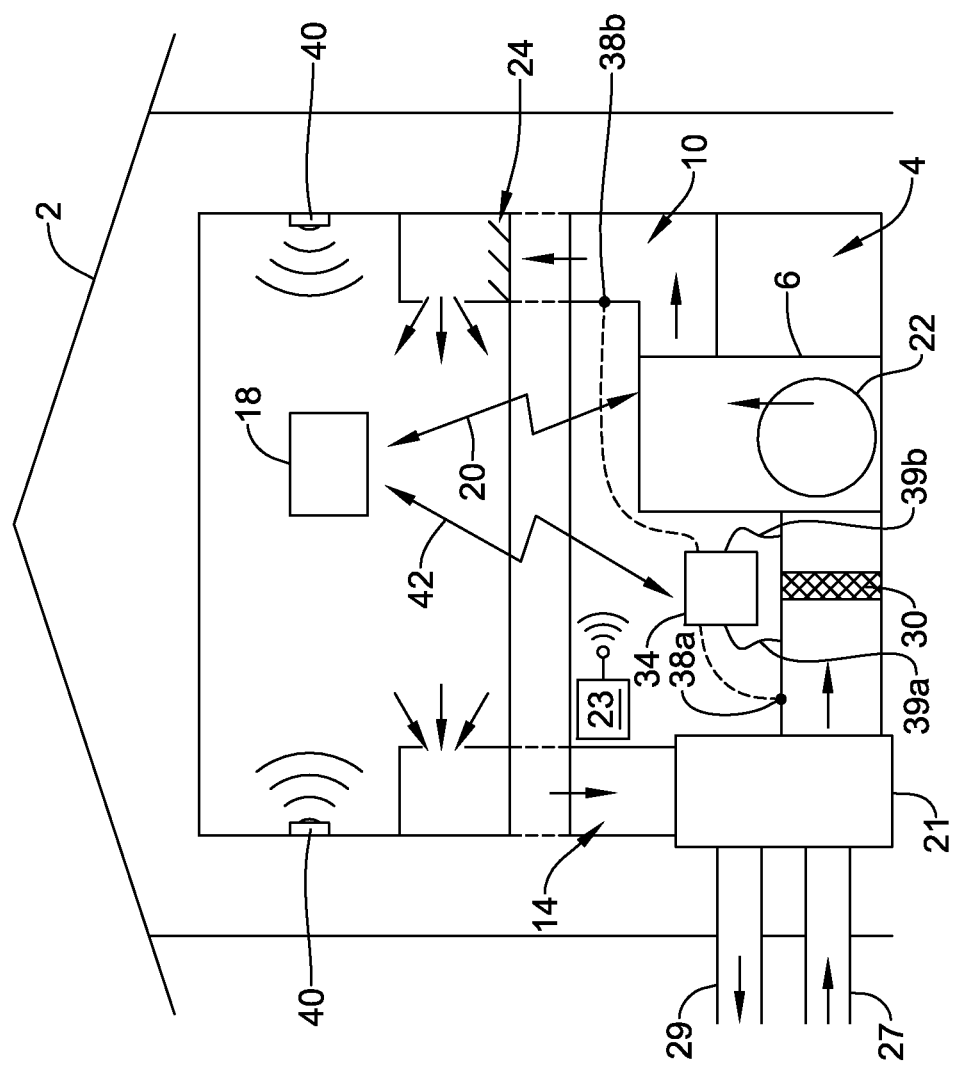
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and at least one HVAC controller 18. The one or more HVAC components 6 may include, but are not limited to, a furnace, a heat pump, an electric heat pump, a geothermal heat pump, an electric heating unit, an air conditioning unit, a ventilation unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. In some cases, the HVAC controller(s) 18 may be configured to activate and deactivate the HVAC component(s) 6 in order to maintain a desired temperature set point in the building 2. The HVAC controller(s) 18 may be configured to control the HVAC component(s) 6 via a wired or wireless communication link 20. The HVAC controller(s) may wirelessly communicate with the one or more HVAC components(s) 6 following a wireless protocol such as, for example, cellular communication, ZigBee, Bluetooth, WiFi, IrDA, dedicated short range communication (DSRC), EnOcean, or any other suitable wireless protocols, as desired.

In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In the illustrative HVAC system 4 shown in FIG. 1, the HVAC component(s) 6 may provide heated air (and/or cooled air) via the ductwork 10 throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

Additionally, in some cases, the HVAC component(s) 6 may exhaust stale air and/or supply fresh air to the building or structure 2 via the ductwork 10 located throughout the building 2. For example, in some cases, the HVAC component(s) 6 may include a ventilation unit 21, which may draw outside air into the building via an outside air intake 27 and at the same time expel inside air via an inside air outlet 29. In some cases, a heat exchanger (not explicitly shown) is provided to exchange heat between the outgoing inside air and the incoming outside air. In some cases, the ventilation unit 21 may include additional fans and/or blowers to facilitate the exchange of stale air from within the building 2 with fresh air supplied from outside the building 2. The ventilation unit 21 may include a ventilation controller (not explicitly shown), that may receive ventilation commands from, for example, the HVAC controller(s) 18, and in response, activate and/or deactivate the various components of the ventilation unit 21 to implement the received ventilation commands. In some cases, the ventilation unit 21 may be coupled to additional ductwork which may draw state air from different locations within the building 2 to be exhausted from the building via the air outlet 29. Additionally, in some cases, the ventilation unit 21 may be a central forced air blower. These are just some examples.

In some cases, the HVAC system 4 may include an optional communications gateway or other device 23 that may allow one or more of the HVAC components 6, as described herein, to communicate wirelessly with one another in accordance with a wireless communications protocol such as, for example, cellular communication, ZigBee, Bluetooth, WiFi, IrDA, dedicated short range communication (DSRC), EnOcean, or any other suitable wireless protocols, as desired. In some cases, the communications gateway 23 may facilitate communication between the various HVAC components 6 over a local area network (LAN), a wide area network (WAN), or the internet. In some cases, the communications gateway 23 may be incorporated into the HVAC controller(s) 18.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components 6 to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

In some cases, the equipment interface module 34 may include a first temperature sensor 38*a* located in the return (incoming) air duct 14, and a second temperature sensor 38*b* located in the discharge (outgoing or supply) air duct 10. Alternatively, or in addition, the equipment interface module 34 may include a differential pressure sensor including a first pressure tap 39*a* located in the return (incoming) air duct 14, and a second pressure tap 39*b* located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

The HVAC system 4 may also include one or more ventilation boost control units 40 that are adapted to communicate with, for example, the at least one HVAC controller 18. In some cases, the one or more ventilation boost control units 40 may be adapted to communicate with equipment interface module (EIM) 34 or any other suitable building control device, as desired. In any event, the one or more ventilation boost control units 40 may be mounted to a wall of the building or structure at a location that is remote from the HVAC controller(s) 18 (or other suitable building control device), and may be sometimes referred to as a ventilation boost control unit 40. In some applications, such as, for example, in a home, the one or more ventilation boost control units 40 may be mounted in a bathroom, laundry room, and/or a kitchen where it may be convenient to an occupant, and where the need for ventilation may be more apparent to the occupant. In some cases, the one or more ventilation boost control units 40 may be configured to send commands to the HVAC controller 18 via a one-way, wired or wireless communication link to increase ventilation within the building 2. In other cases, the one or more ventilation boost control units 40 may be configured to send and/or receive commands to and from the HVAC controller 18 via a two-way, wired or wireless communication link. The communication link established between the one or more ventilation boost control units 40 and the one or more HVAC controllers 18 may be a direct communication link, or alternatively, an indirect communication link where communication between the ventilation boost control units 40 and the one or more HVAC controllers 18 is routed through a communications device such as, for example, communications gateway 23.

Figure 2:
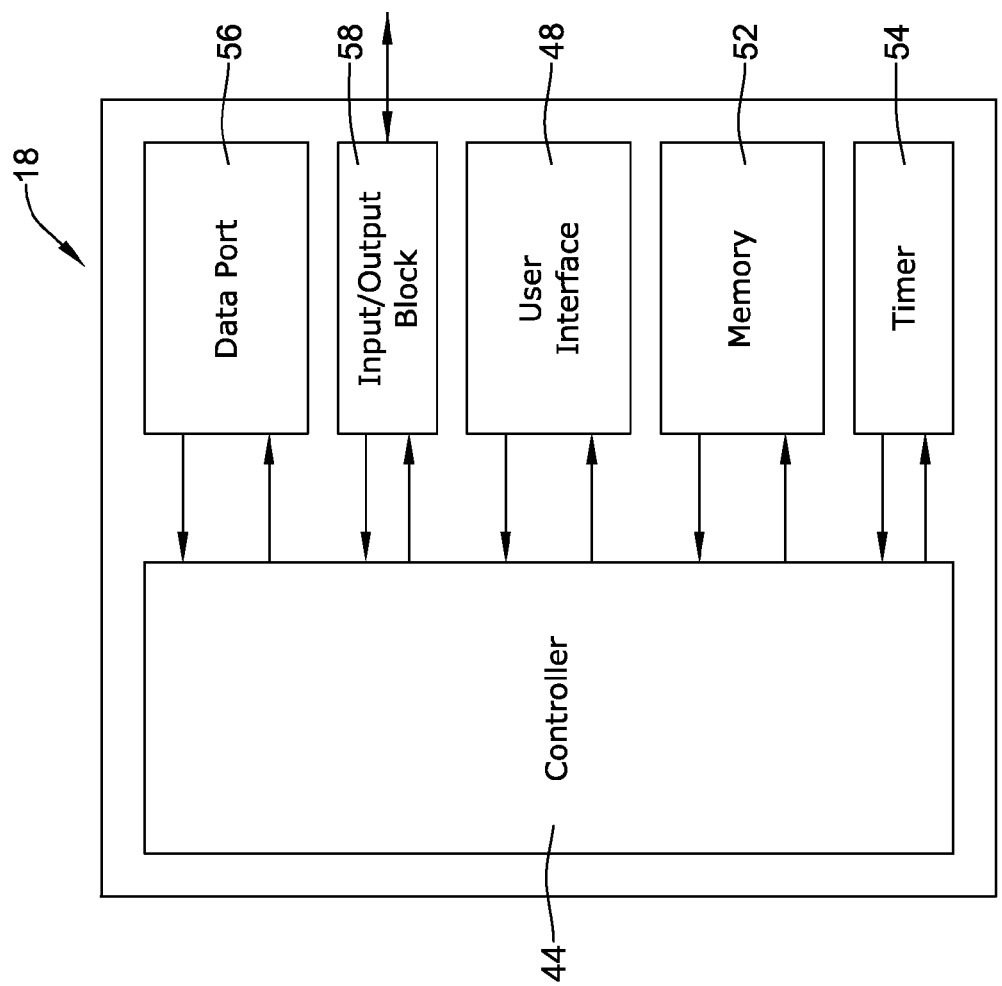
FIG. 2 is a schematic view of an illustrative HVAC controller.

FIG. 2 is a schematic view of an illustrative HVAC controller 18. In some instances, HVAC controller 18 may be a thermostat, but this is not required in all embodiments. In the illustrative embodiment of FIG. 2, HVAC controller 18 includes a controller 44 (e.g. microprocessor, microcontroller, etc.), a user interface 48, a memory 52, and a timer 54. The timer 54 may be integral to the controller 44 or may be provided as a separate component. In some cases, the HVAC controller 18 may optionally include an input/output block (I/O block) 58 for receiving one or more signals from the HVAC system 4 and/or for providing one or more control signals to the HVAC system 4. For example, the I/O block 58 may communicate with one or more HVAC components 6 of the HVAC system 4. Additionally, in some cases, the I/O block 58 may communicate (wired or wirelessly) with one or more ventilation boost control units 40. Still, alternatively, or in addition, the I/O block 58 may communicate with another controller, which is in communication with one or more HVAC components 6 of the HVAC system 4, such as a zone control panel in a zoned HVAC system, equipment interface module (EIM) 34, ventilation unit 21 or any other suitable building control device. In some cases, I/O block 58 include a wireless transmitter/receiver and may establish a wireless communication link to one or more of the ventilation boost control units 40 and/or other devices or components.

The controller 44 may operate in accordance with an algorithm that controls or at least partially controls one or more HVAC components 6 of an HVAC system such as, for example, HVAC system 4 shown in FIG. 1. The controller 44 may, for example, operate in accordance with an algorithm that provides temperature set points, starting and/or ending times, and the like. In many cases, the controller 44 may be configured to read a temperature sensed by the temperature sensor and control the one or more HVAC components 6 of the HVAC system 4 in to maintain a desired temperature set point within the building 2 over a period of time as determined by the algorithm. Additionally, in some cases, the controller 44 may be configured to control the one or more HVAC components 6, including a ventilation unit 21, to provide ventilation to the building 2 for a predetermined amount of time. In some cases, the controller 44 may be configured to command the ventilation unit 21 to ventilate the building 2 for a predetermined amount of time according to a predetermined schedule stored in the HVAC controller memory 52. In addition, the controller 44 may be configured to command the ventilation unit 21 to ventilate the building 2 for a predetermined period of time in response to a user request (i.e. on-demand). For example, in response to a user request, the controller 44 may command the ventilation unit 21 to provide a temporary "boost" in ventilation according to a predetermined amount of time as requested by the user. In some cases, this may be in addition to ventilation that is already being provided according to a predetermined schedule. The user request may be received at a remotely located ventilation boost control unit 40 or via the user interface 48 of the HVAC controller 18, as desired. For example, in some cases, the controller 44 may be configured to receive a signal indicative of a request for ventilation for a predetermined amount of time from one or more of the ventilation boost control units 40 located throughout the building 2, and/or via the user interface 48 of the HVAC controller 18, and in response, to send one or more on/off or other commands to a ventilation controller of the ventilation unit 21 to ventilate the building for an amount of time that is based, at least in part, on the predetermined amount of time.

Because more than one ventilation boost control unit 40 may be located within the building, the controller 44 may be configured to coordinate and/or prioritize competing requests for ventilation that are received by the HVAC controller 18. In some cases, the competing requests for ventilation may be received from the one or more ventilation boost control units 40 and/or via the user interface 48 of the HVAC controller 18. In any event, the controller 44 may be configured to coordinate competing requests for ventilation. For example, if a first request is active when a second request is received by the controller 44, the controller 44 may be configured to compare a remaining time of the first request to the requested time of the second request. If the controller 44 determines that the requested time of the second request is greater than the remaining time of the first request, then controller 44 may be configured to command the ventilation unit 21 to ventilate according to the second request. However, if the controller 44 determines that the requested time of the second request is less than the remaining time of the first request, then the controller 44 may be configured to ignore the second request for ventilation.

In some cases, a ventilation request may also be received and accepted through the user interface 48 of the HVAC controller 18. In such cases, the controller 44 may be configured to override a request for ventilation received from one or more of the remotely located ventilation boost control units 40, particularly if a subsequent request for ventilation is received via the user interface 48 of the HVAC controller 18. For example, if the controller 44 receives a request for ventilation for a predetermined amount of time through the user interface 48 of the HVAC controller, the controller 44 may be configured to cancel any previous request for ventilation received from a remotely located ventilation boost control unit 40, and to command the ventilation unit 21 to ventilate according to the predetermined amount of time of the request received through the user interface 48 of the HVAC controller 18. In another example, the controller 44 may be configured to cancel a request for ventilation received from one or more of the ventilation boost control units 40 if a subsequent request for cancelling ventilation is received via the user interface 48 of the HVAC controller 18.

In the illustrative embodiment of FIG. 2, user interface 48 may be any suitable user interface that permits HVAC controller 18 to display and/or solicit information, as well as accept one or more user interactions with the HVAC controller 18. For example, the user interface 48 may permit a user to enter data such as temperature set points, humidity set points, starting times, ending times, diagnostic limits, conditions under which diagnostic limits may be suspended, responses to alerts, requests for ventilation, and/or the like. In some cases, as discussed herein, the HVAC controller 18 may be configured to receive and accept a request for ventilation for a predetermined amount of time, a user selected time, according to a ventilation schedule, and/or for any other time period, as desired.

In some cases, user interface 48 may include a display and a distinct keypad. A display may be any suitable display. In some instances, a display may include or may be a liquid crystal display (LCD), and in some cases a fixed segment display or a dot matrix LCD display. If desired, user interface 48 may be a touch screen LCD panel that functions as both display and keypad. In some instances, a touch screen LCD panel may be adapted to solicit values for a number of operating parameters and/or to receive such values, but this is not required.

The memory 52 of the illustrative HVAC controller 18 may be in communication with the controller 44. Memory 52 may be used to store any desired information, such as the aforementioned control algorithm, set points, schedule times, diagnostic limits such as, for example, differential pressure limits, delta T limits, and the like. Memory 52 may be any suitable type of storage device including, but not limited to, RAM, ROM, EPROM, flash memory, a hard drive, and/or the like. In some cases, controller 44 may store information within memory 52, and may subsequently retrieve the stored information.

The HVAC controller 18 may also include at least one timer 54. In some cases, the timer 54 may be integral with the controller 44, but this is not required. The timer 54 may be used for tracking the start times and/or end times of a schedule stored in the controller memory 52. In other cases, the timer 54 may include a ventilation boost timer and may be used for tracking a ventilation time. The ventilation time may be a predetermined amount of time that may correspond to a request for boost ventilation, and in some cases, may range from zero to three hours. In some cases, the predetermined amount of time may correspond to any one of 10 minutes, 20 minutes, 30 minutes, 40 minutes, 45 minutes, 60 minutes, 80 minutes, 90 minutes, 100 minutes, 120 minutes, 140 minutes, 150 minutes, 160 minutes, or 180 minutes. In some cases, the timer 54 may be used for tracking a remaining time of the predetermined amount of time after ventilation has been initiated in response to a user request.

In some cases, as illustrated in FIG. 2, HVAC controller 18 may include a data port 56. Data port 56 may be a wireless port such as a Bluetooth™ port or any other wireless protocol. In other cases, data port 56 may be a wired port such as a serial port, a parallel port, a CAT5 port, a USB (universal serial bus) port, and/or the like. In some instances, data port 56 may be a USB port and may be used to download and/or upload information from a USB flash drive or some other data source. Other remote devices may also be employed, as desired.

Data port 56 may be configured to communicate with controller 44 and may, if desired, be used to upload information to controller 44 and/or download information from controller 44. Information that can be uploaded and/or downloaded may include, for example, values of operating parameters. In some instances, data port 56 may be used to upload a previously-created thermostat configuration into HVAC controller 18, thereby hastening the programming process. In some cases, data port 56 may be used to download a thermostat configuration that has been created using HVAC controller 18, so that the thermostat configuration may be transferred to other similar thermostats, hastening their programming process. In some cases, data port 56 may be used to upload and/or download information pertaining to an HVAC dealer or contractor, if desired. In some cases, data port 56 may be used to download data stored within the memory 52 for analysis. For example, data port 56 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XNL, and/or Adobe PDF® file, but this is certainly not required.

Figure 3:
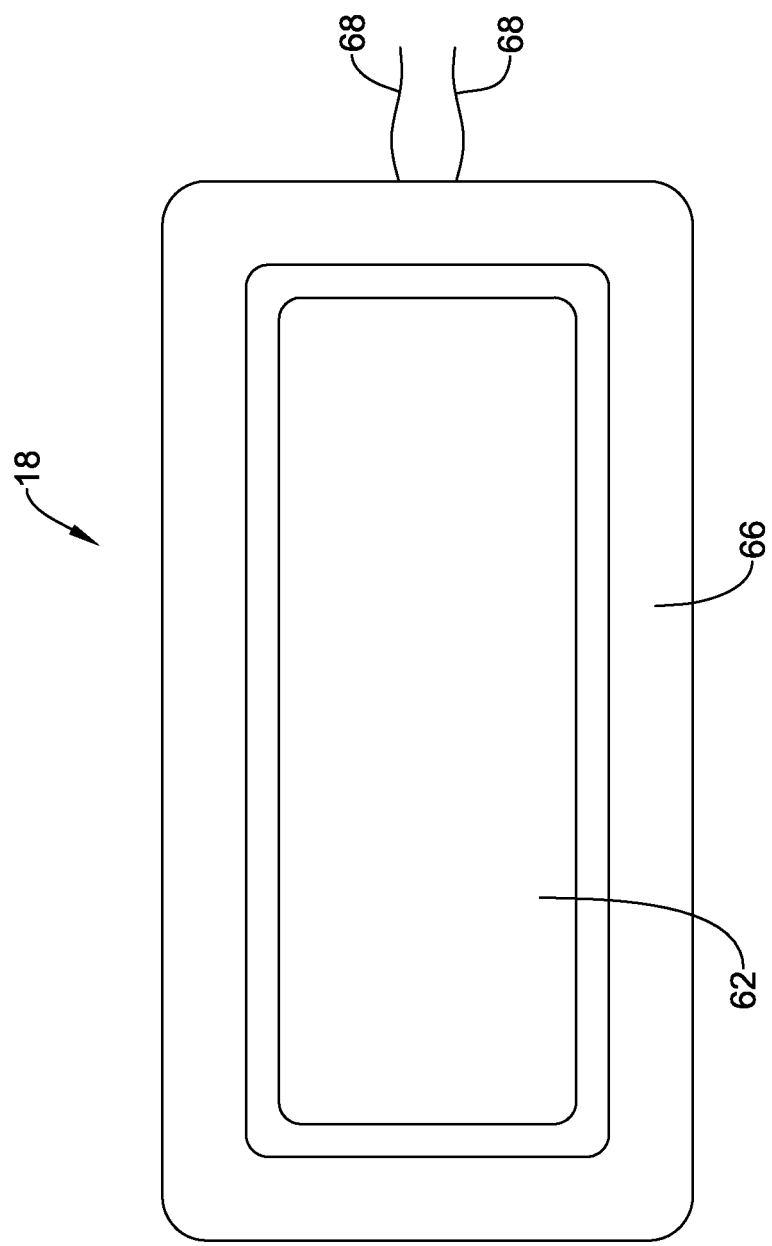
FIG. 3 is a front view of an illustrative HVAC controller.

FIG. 3 is a front view of an illustrative HVAC controller 18. In some cases, HVAC controller 18 may be configured to provide substantial display and/or programming functionality. In the illustrative embodiment of FIG. 3, HVAC controller 18 may include a display 62 that is disposed within a housing 66 but viewable externally from the housing 66. In some cases, display 62 may be a touch screen LCD display. If desired, display 62 may be a dot matrix touch screen LCD display. A dot matrix touch screen LCD display is a touch screen LCD that permits images such as letters, numbers, graphics, images, and the like to be displayed anywhere on the LCD, rather than being confined to predetermined locations such as is the case with a fixed segment type of LCD display. Housing 66 may be formed of any suitable material, such as a polymeric material. In some cases, the housing 66 may be formed such that it defines a data port 56 (see FIG. 2). In some cases, the housing 66 may also include suitable wiring and/or other electrical connections 68 such that the HVAC controller 18 may be electrically coupled to the HVAC system 4, but this is not required.

Figure 4:
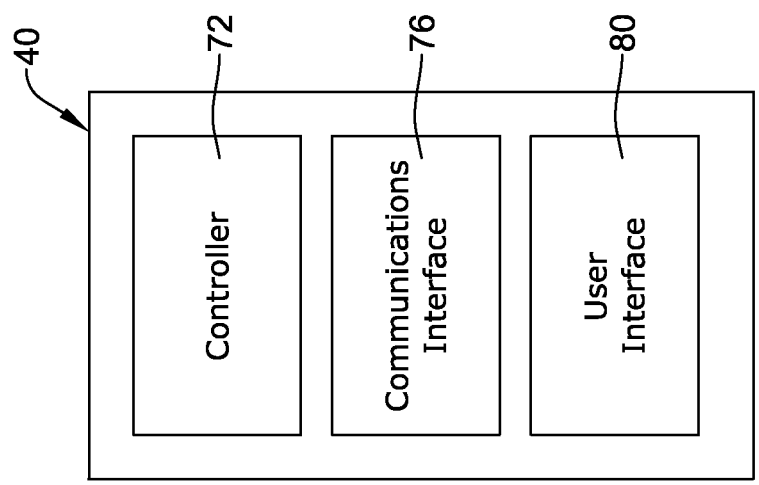
FIG. 4 is a schematic view of an illustrative ventilation boost control unit for use with an HVAC controller.

FIG. 4 is a schematic view of an exemplary ventilation boost control unit 40 that is adapted to communicate with one or more HVAC controller(s) such as, for example, the illustrative HVAC controller 18 of FIGS. 2 and 3. In the illustrative embodiment, the ventilation boost control unit 40 includes a controller 72 (e.g. microprocessor, microcontroller, etc.), a communications interface 76, and a user interface 80. The controller 72 of the ventilation boost control unit 40 may be configured to send one or more signals indicative of a request for ventilation for a predetermined amount of time to the at least one HVAC controller 18. The communications interface 76 may be used to establish a communication link with the at least one HVAC controller 18, as described herein. It is contemplated that the communication link established between the HVAC controller 18 and the ventilation boost control unit 40 may be a wired or wireless communication link, sometimes between the communications interface 76 of the ventilation boost control unit 40 and the I/O block 58 of the HVAC controller 18. In some cases, the communications interface 76 of the ventilation boost control unit 40 may be a wireless transmitter for wirelessly transmitting a signal to the HVAC controller 18. In other cases, communications interface 76 of ventilation boost control unit 40 may be a wireless transmitter/receiver for wireless sending and/or receiving signals to and from the HVAC controller 18 via the established communication link. The user interface 80 of the ventilation boost control unit 40 may be any suitable user interface that facilitates interaction between a user and the ventilation boost control unit 40. In many cases, the user interface 80 may be configured to accept one or more user interactions. For example, the user interface 80 may include one or more selectable buttons and/or a display for displaying information to a user. In some cases, the user interface 80 may include a touch screen display with one or more selectable icons appearing on the display for selection by a user. In other cases, the user interface 80 may include a fixed segment display or a liquid crystal display that is provided separately from one or more selectable options or buttons that are available for selection by a user. In still other cases, the user interface 80 may not include a display unit, and may only include one or more selectable buttons that are available for selection by a user.

Figure 5:
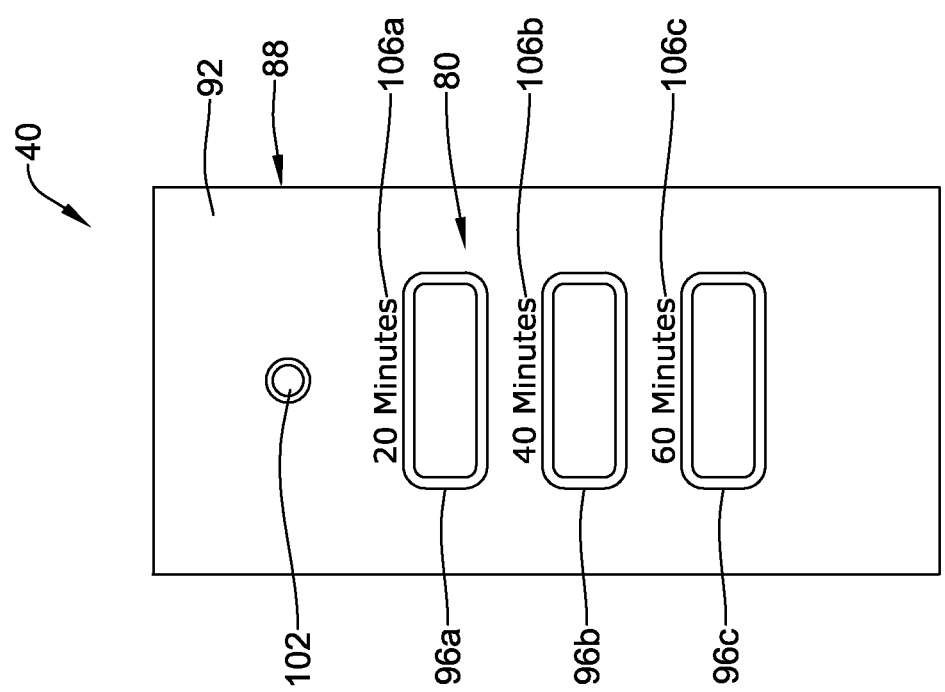
FIG. 5 is a front view of an illustrative ventilation boost control unit for use with an HVAC controller.

FIG. 5 is a front view of an exemplary ventilation boost control unit 40. In some cases, the ventilation boost control unit 40 may be a wireless ventilation boost control unit 40 adapted to communicate wirelessly with an HVAC controller 18, as described herein. As shown in FIG. 5, the ventilation boost control unit 40 may include a housing 88 having a housing cover 92. In addition, the ventilation boost control unit 40, as shown in the illustrative example of FIG. 5, may include a user interface generally shown at 80 that includes one or more individually selectable buttons 96a, 96b, 96c, and an indicator light 102 (e.g. LED). Each of the selectable buttons 96a, 96b, and 96c may correspond to a different predetermined ventilation time. For example, the first button 96a may correspond to a first predetermined ventilation time, the second button 96b may correspond to a second predetermined ventilation time, and the third button 96c may correspond to a third predetermined ventilation time. In some cases, each of the buttons 96a, 96b and 96b may include an identifying label 106a, 106b and 106c printed, engraved or embossed directly on, above, or below the button 96a, 96b, and/or 96c to which the identifying label corresponds. For example, first button 96a may include the identifying label 106a "20 minutes," second button 96b may include the identifying label "40 minutes," and third button 96c may include the identifying label "60 minutes." These are just some example labels.

The indicator light 102 may be a Light Emitting Diode (LED), but this is not required. The indicator light 102, when provided, may be adapted to change colors and/or flash. For example, the indicator light 102 may be adapted to flash or rapidly blink on and off when a user selects one of the first button 96a, second button 96b, and/or third button 96c.

Figure 6:
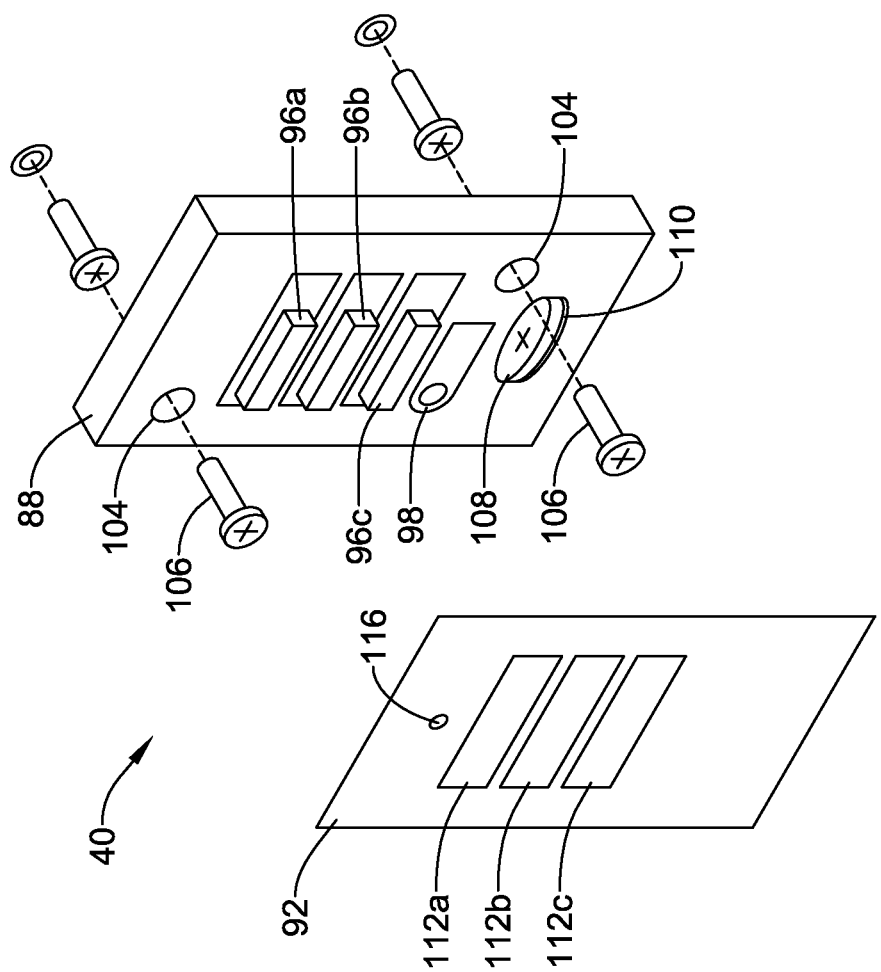
FIG. 6 is an exploded perspective view of the illustrative ventilation boost control unit of FIG. 5.

FIG. 6 is an exploded view of the ventilation boost control unit 40 of FIG. 5, showing the cover 92 removed from the housing 88. The housing 88 and the cover 92 may be formed of any suitable material, such as a polymeric material. In some cases, the housing 88 may be formed such that it defines or holds each of the buttons 96a, 96b and 96c. The housing 88 may include an additional button 98, which in the illustrative embodiment, is not visible to the user until the cover 92 is removed from the housing 88. The button 98 may be a "connect" button 98 that, when selected by a user, causes the ventilation boost control unit 40 to broadcast a signal to the one or more HVAC controllers 18, commanding the one or more HVAC controllers 18 to recognize and enroll the ventilation boost control unit 40, thereby establishing a communication link between the ventilation boost control unit 40 and the corresponding HVAC controllers 18.

In some cases, the indicator light 102 may flash or remain yellow until the ventilation boost control unit 40 is enrolled with each of the one or more available HVAC controllers 18, and a communication link is established between the one or more HVAC controllers 18 and the ventilation boost control unit 40. The indicator light 102 may cease flashing or may turn color from yellow to green once the ventilation boost control unit 40 is enrolled with each of the one or more available HVAC controllers 18 and/or once a communication link is established between the ventilation boost control unit 40 and the one or more HVAC controllers 18. In some cases, the indicator light 102 may form at least a portion of the connect button 98, but this is not required.

In some instances, the housing 88 may include one more features for mounting the housing 88 to a wall or other suitable surface of the building or structure. The features may be formed integrally with the housing 88 or may be provided separate from the housing 88. In some cases, as shown, the housing 88 may include one or more holes or apertures 104 for receiving at least a part of one or more fasteners 106 for securing the housing 88 to a wall or other suitable surface of the building or structure. Exemplary fasteners may include screws, nails, bolts, wall anchors, and the like.

In some cases, the housing 88 may also include suitable wiring and/or other electrical connections such that the ventilation boost control unit 40 may be electrically wired into a power source and/or be in electrical communication with one or more HVAC controllers 18 via a wired communication link, but this is not required in all embodiments. In other cases, regardless of whether or not the communication link between the control unit and the one or more HVAC controllers 18 is a wired or wireless link, the housing 88 may include a battery compartment 108 for housing at least one battery 110. The at least one battery 110 may be used to provide primary power and/or backup power to the ventilation boost control unit 40, as desired.

In the example shown in FIG. 6, the cover 92, when provided, may include one or more slots or windows 112a, 112b, 112c through which the buttons 96a, 96b, 96c may be viewable and accessible to a user. Additionally, the cover 92 may include an additional window 116 through which the indicator light 102 is visible to the user. The cover 92 may be secured to the housing 88 via friction fit, a snap fit, one or more pairs of mating connectors, or in any other suitable manner. The cover 92 may be removable such that the at least one battery 110 may be replaced when the battery level runs low.

It is contemplated that one or more ventilation boost control units 40, such as described herein, may be installed at one or more locations throughout the building 2. In some cases, for example, the ventilation boost control unit 40 may be installed at a location where the need for ventilation may be more apparent to a building occupant or where it may provide convenient access to a user. For example, a ventilation boost control unit 40 may be installed in a kitchen, laundry room, and/or one or more bathrooms of a home. During use, the user may select a button such as, for example, button 96a, 96b, or 96c corresponding to a predetermined ventilation time when the user desires ventilation within the building. The ventilation boost control unit 40 may send a signal to the HVAC controller(s) 18 indicative of a request for ventilation and in response, the HVAC controller 18 may send one or more commands to a ventilation controller of the ventilation unit 21 to ventilate the building for a ventilation time based, at least in part, on the predetermined ventilation time.

In some instances, a ventilation boost control unit 40 may be installed at the same time as the HVAC controller(s) 18 (e.g. new installation). In other instances, a ventilation boost control unit 40 may be installed in a building or structure that has an existing HVAC controller(s) 18 (e.g. post-installation). In either case, a communication link may need to be established between the ventilation boost control unit 40 and the HVAC controller(s) 18 so that the ventilation boost control unit 40 may send signals indicative of a request for ventilation to the HVAC controller(s) 18.

In some instances, a communication link between the ventilation boost control unit 40 and the HVAC controller 18 may be established by selecting the connect button 98 provided on the ventilation boost control unit 40 (FIG. 6). Selection of the connect button 98 may cause the ventilation boost control unit 40 to send a signal (e.g. broadcast) to the one or more HVAC controllers 18, commanding the one or more HVAC controllers 18 to recognize and enroll the ventilation boost control unit 40 as part of the HVAC system 4, establishing a communication link between the ventilation boost control unit 40 and the one or more HVAC controllers 18. The communication link may be a one-way communication link or a two-way communication link. Additionally, the communication link may be a wireless communication link.

Figure 7:
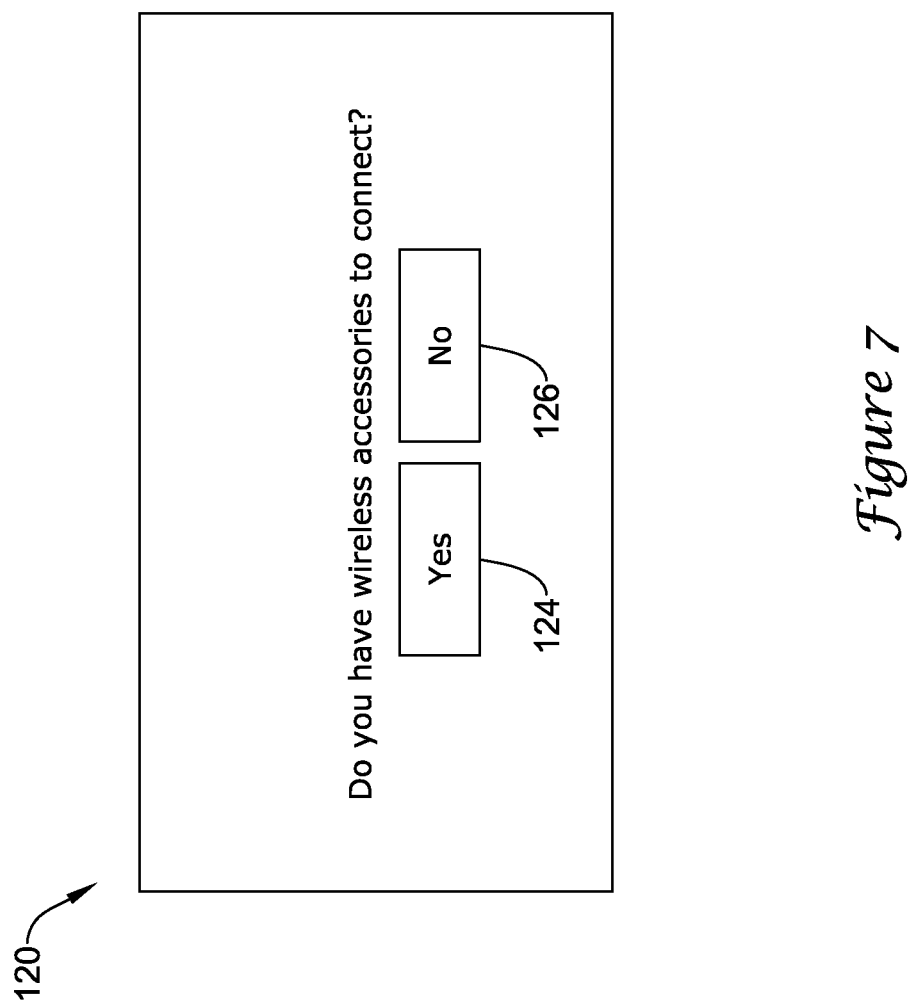
FIGS. 7-13 show several illustrative screens that may be displayed on the HVAC controllers of FIGS. 2 and 3 when in use.
Figure 8:
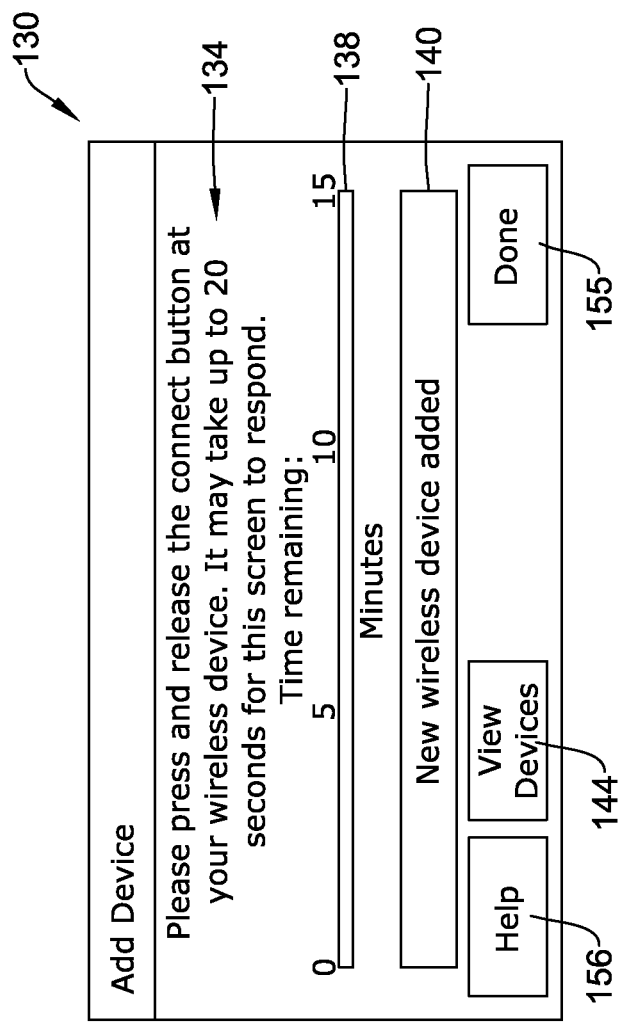
Figure 9:
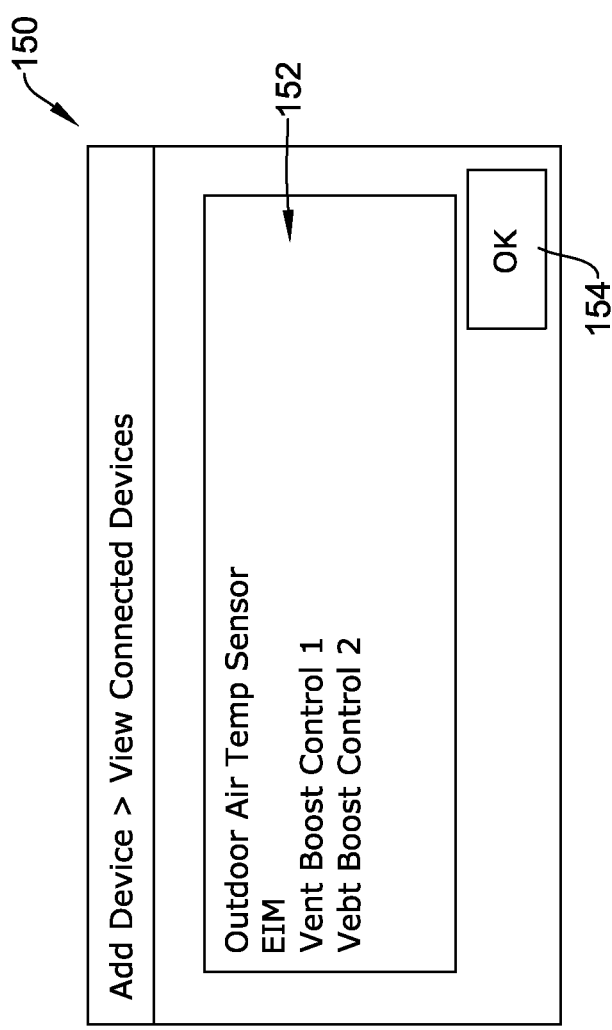

In some cases, the HVAC controller 18 may display one or more screens on the display 62 of the user interface 48 that may guide a user through establishing a communication link between the HVAC controller 18 and a ventilation boost control unit 40. FIGS. 7-9 show several illustrative screens that may be displayed on the display 62 of an exemplary HVAC controller 18 during set-up of the HVAC controller 18 with a ventilation boost control unit 40. In some cases, during set-up of the HVAC controller 18, the HVAC controller 18 may display a user query screen 120 that queries the user about any wireless accessories such as, for example, ventilation boost control unit 40, which may need to be connected to the HVAC controller 18. User query screen 120 may include one or more options for responding. For example, as shown in FIG. 7, user query screen 120 may include a first option 124 labeled "Yes" and second option 126 labeled "No." Selection of the first option 124 labeled "Yes" may cause the HVAC controller 18 to subsequently display a connection prompt screen 130, as shown in FIG. 8, which may prompt the user to take a certain action to facilitate connection of a selected wireless device (e.g. ventilation boost control unit 40) with the HVAC controller 18.

With reference to FIG. 8, and in some cases, connection prompt screen 130 may include a first user message 134 that instructs the user to press and release a connect button (e.g. connect button 98 of FIG. 6) at the wireless device (e.g. ventilation boost control unit 40). Additional information that may be useful to the user may be optionally included within the user message 134. In some cases, connection prompt screen 130 may include a status bar 138 that may display the amount of time that has lapsed since connection between the HVAC controller 18 and the wireless device (e.g. ventilation boost control unit 40) was attempted, however, this is not required. Upon successful connection of the HVAC controller 18 with the wireless device (e.g. ventilation boost control unit 40), the HVAC controller 18 may display a second user message 140 on the connection prompt screen 130, indicating that a new wireless device (e.g. ventilation boost control unit 40) has been added. In some cases, and when provided, the second user message 140 may be displayed on another subsequent screen, on a pop-up screen, or any in other suitable manner, as desired.

In some cases, connection prompt screen 130 may include an option 144 that, when selected, may cause the HVAC controller 18 to display a screen 150 as shown in FIG. 9, which may display a list of devices 152 that are currently enrolled with the HVAC controller 18. In FIG. 9, four devices are shown including two ventilation boost control units. Selection of button 154 labeled "OK" in FIG. 9 may cause the HVAC controller 18 to return to displaying the connection prompt screen 130.

Figure 10:
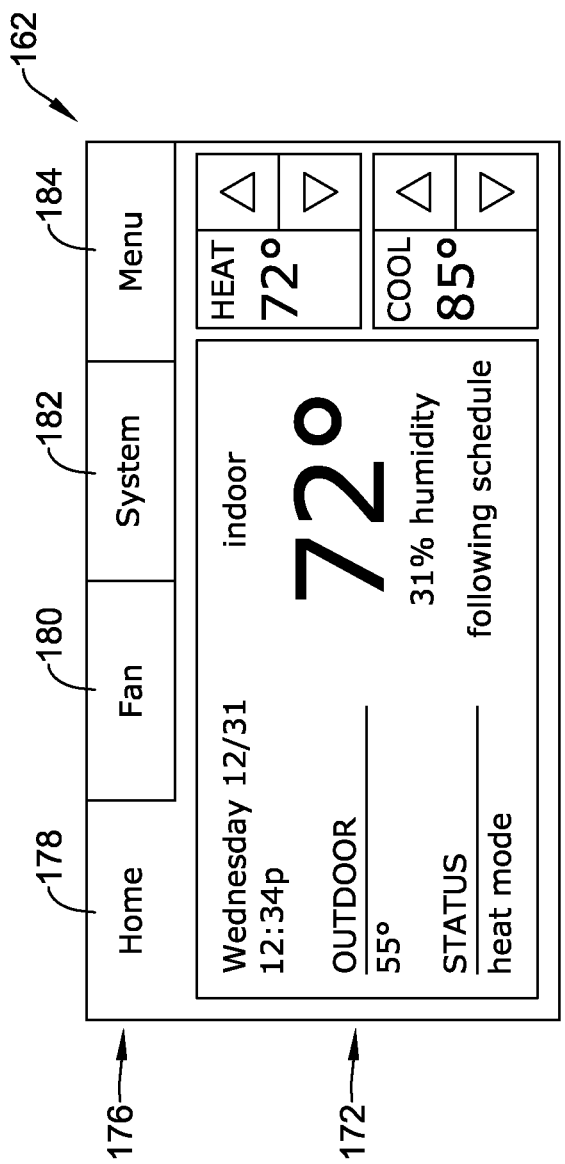

Connection prompt screen 130 may also include a button 156 labeled "Help" that, when selected, may cause the HVAC controller 18 to display additional information about the connection prompt screen 130 that may be helpful to a user. In some cases, selection of the button 155 labeled "Done" or "Finished" may cause the HVAC controller 18 to display additional screens related to setting up the HVAC controller 18. In other cases, selection of the "Done" button 155 may cause the HVAC controller 18 to display a home screen such as shown in FIG. 10, and as discussed in greater detail below. It will be understood that a similar set of screens may be displayed for any additional wired accessories needing connection to the HVAC controller 18, as necessary or desired.

As discussed above, a request for ventilation may be entered by a user through the user interface 48 of the HVAC controller 18. FIGS. 10-13 show several illustrative screens that may be displayed on the user interface of an exemplary HVAC controller 18 when in use. FIG. 10 is an example of a home screen 172 that may be displayed by an HVAC controller 18 on its display 62 when no data entry is underway for a period of time or, in some cases, after a user has pushed a HOME button 178. In many cases, the illustrative home screen 172 of FIG. 10 may include a navigational bar 176 along the top. Navigational bar 176 may be considered as providing top level navigation. In some cases, if desired, navigational bar 176 may include a HOME button 178, a FAN button 180, a SYSTEM button 182 and/or a MENU button 184. In the illustrative embodiment, the user may access one or more menus from which the user may make a temperature set point change, a humidity set point change, an indoor air quality change, a programmable schedule change, a system mode change, a fan setting change, an installer set-up change, an exit/entry remote setting change, among others.

Figure 11:
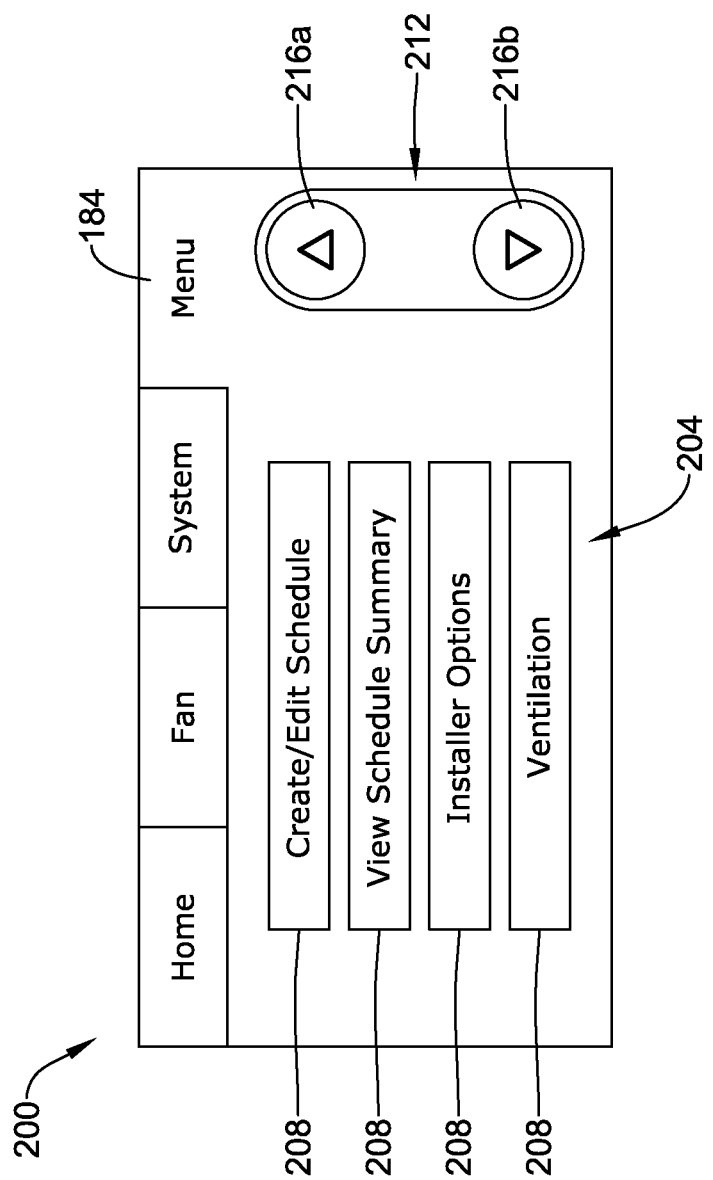

FIG. 11 shows an illustrative example of a menu screen 200 that may be displayed when a user selects the MENU button 184 on home screen 172 of FIG. 10. The illustrative menu screen 200 may include a table 204 that includes one or more selectable menu options 208 that may be selected by the user. In some cases, the table 204 may be a scrolling table, in which case the menu screen 200 may also include a scroll bar 212 including first and second arrows 216a, 216b that may facilitate a user in scrolling through the available menu options 208.

Figure 12:
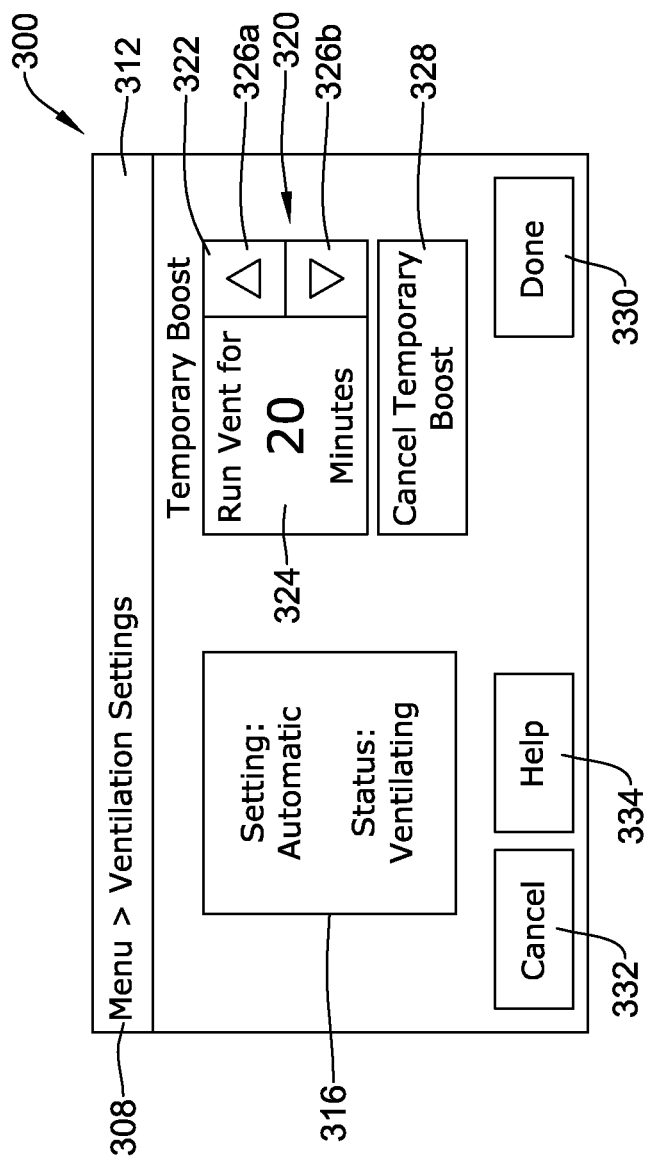
Figure 13:
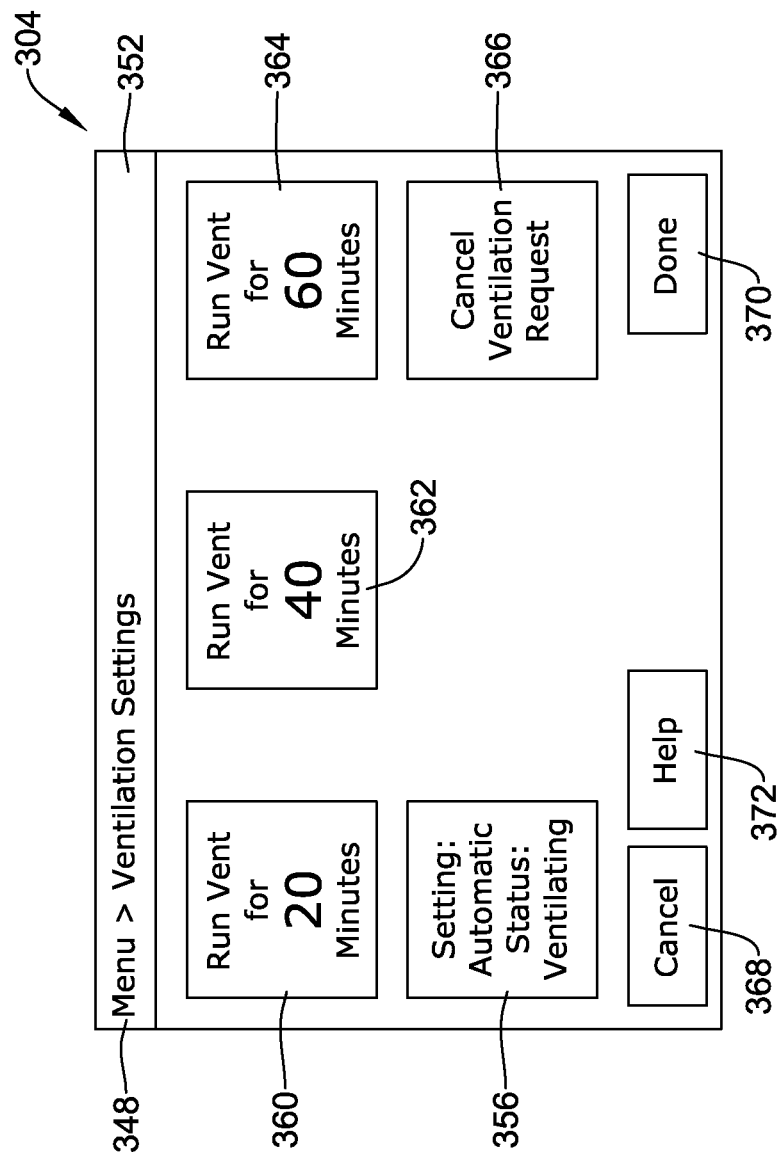

In some cases, a Ventilation option 208 may be provided, which may provide access to a ventilation control screen 300 or 304, as shown in FIGS. 12 and 13, respectively, which may allow a user to request a temporary boost in ventilation from a ventilation unit 21 that forms a part of the HVAC system 4. As shown in FIG. 12, ventilation control screen 300 includes a banner 308 that may be located near a top region 312 of the screen, and that may identify the user's location within the menu hierarchy. Additionally, ventilation control screen 300 may include a first region 316 that may identify a current ventilation setting (e.g. automatic) and/or a current ventilation status (e.g. ventilating). Ventilation control screen 300 may also provide one or more selectable options for requesting and/or cancelling a ventilation boost in a second region 320. In the example provided in FIG. 12, the second region 320 of ventilation screen 300 includes a box 322 that may display a ventilation time 324 and first and second arrows 326a, 326b for increasing or decreasing the temporary ventilation boost time 324 displayed in the box. In some cases, the ventilation time may be increased or decreased in increments of 5, 10, 15, or 20 minutes using the first and second arrow keys 326a, 326b. Second region 320 may also include an additional selectable option 328 for cancelling the ventilation boost request received via ventilation control screen 300 and/or ventilation boost requests received from one or more remotely located ventilation boost control units such as, for example, ventilation boost control unit 40, as discussed herein.

Upon selection of the button 330 labeled "DONE", the HVAC controller 18 may receive and accept the request for a temporary boost in ventilation according to the ventilation time indicated by the user, and may command the ventilation unit 21 to ventilate or increase ventilation for the predetermined ventilation time selected by a user through the ventilation control screen 300. In addition, selection of the "DONE" button 330 may cause the HVAC controller 18 to display either the previous screen (e.g. menu screen 200 of FIG. 11) or, in some cases, a home screen such as home screen 172 of FIG. 10.

In some cases, ventilation control screen 300 may include a button 332 labeled "Cancel" that, when selected, may cause HVAC controller 18 to display a previous screen such as, for example, menu screen 200 of FIG. 11. In addition, as shown, ventilation control screen 300 may include a button 334 labeled "Help" that, when selected, may cause HVAC controller 18 to display additional information about the current screen that may be helpful to a user.

FIG. 13 shows another illustrative example of a ventilation control screen 304 that may be displayed by HVAC controller 18. As shown in FIG. 13, ventilation control screen 304 may include a banner 348 that may be located near a top region 352 of the screen, and may identify the user's location within the menu hierarchy. Additionally, ventilation control screen 304 may include a first region 356 that may identify a current ventilation setting (e.g. automatic) and/or a current ventilation status (e.g. ventilating). Ventilation control screen 304 may also provide one or more independently selectable options 360, 362, 364, and 366 for requesting and/or cancelling a ventilation boost. For example, as shown in FIG. 13, ventilation control screen 304 may include a first selectable option 360 for requesting a ventilation boost for a first predetermined amount of time (e.g. 20 minutes), a second selectable option 362 for requesting a ventilation boost for a second predetermined amount of time (e.g. 40 minutes), and a third selectable option 364 for requesting a ventilation boost for a third predetermined amount of time (e.g. 60 minutes). Additionally, ventilation control screen 304 may include an option 366 for cancelling a ventilation boost request received via ventilation control screen 304 and/or ventilation boost requests received from a remotely located ventilation boost control unit such as ventilation boost control unit 40. Upon selection of the first option 360, the second option 362, or the third option 364, HVAC controller 18 may receive and accept the request for a temporary boost in ventilation according to the predetermined amount of time corresponding to the selected option. The HVAC controller 18 may then send one or more commands to a ventilation controller of the ventilation unit 21 to ventilate or increase ventilation for the predetermined amount of time. Upon selection of the option 366 to cancel a ventilation request, the HVAC controller 18, if applicable, may command the ventilation unit 21 to cease ventilation and/or return to ventilating according to a predetermined ventilation schedule.

In some cases, ventilation control screen 304 may also include a button 368 labeled "Cancel" that, when selected, may cause HVAC controller 18 to display a previous screen such as, for example, menu screen 200 of FIG. 11. Selection of the "DONE" button 370 may also cause the HVAC controller 18 to display either the previous screen (e.g. menu screen 200 of FIG. 11) or, in some cases, a home screen such as home screen 172 of FIG. 10. In addition, as shown, ventilation control screen 304 may also include a button 372 labeled "Help" that, when selected, may cause HVAC controller 18 to display additional information about the current screen that may be helpful to a user.

FIG. 14 is a flow chart 400 showing an illustrative method that may be used by the HVAC controller 18. According to the illustrative method, a first request for ventilation for a first predetermined amount of time may be received by the HVAC controller (Block 404). The first request may be received from a remotely located ventilation boost control unit (e.g. ventilation boost control unit 40) or via the user interface 48 of the HVAC control. In response to the first request, the HVAC controller 18 may command a ventilation unit 21 to ventilate for the first predetermined amount of time (Block 408). For ventilation units 21 that have a variable speed fan, ventilation may occur at a higher fan speed. For ventilation units 21 that have a single speed fan, the fan may be actuated between "off" and "on." A second request for ventilation for a second predetermined amount of time may be received by the HVAC controller (Block 412). The second request may be received at a later time than the first request, and may be received from a remotely located ventilation boost control unit (e.g. ventilation boost control unit 40) or via the user interface 48 of the HVAC control. If the first request is still active when the second request has been received by the HVAC controller 18, the HVAC controller 18 may compare a remaining time of the first predetermined amount of time to the second predetermined amount of time (Block 416). If the HVAC controller 18 determines that the second predetermined amount of time is greater than the remaining time of the first predetermined amount of time, then the HVAC controller 18 may be configured to command the ventilation unit 21 to ventilate according to the second predetermined amount of time. However, if the HVAC controller 18 determines that the second predetermined amount of time is less than the remaining time of the first predetermined amount of time, then the HVAC controller 18 may be configured to ignore the second request for ventilation. In some cases, any request for ventilation received through the user interface 48 of the HVAC controller 18 may override any previous request for ventilation, including those previously received from the ventilation boost control units 40.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A thermostat configured to control one or more components of an HVAC system of a building including a ventilation unit with an air-to-air heat exchanger, the ventilation unit having a ventilation controller, the thermostat comprising:
 a housing;
 a temperature sensor;
 a user interface including a display;
 a memory;
 an I/O block for sending and/or receiving signals to and/or from the one or more components of the HVAC system, including the ventilation unit and one or more wireless ventilation boost control units;
 a controller coupled to the temperature sensor, the user interface, the memory, and the I/O block;
 the temperature sensor, the user interface, the memory, the I/O block, and the controller housed by the housing; and
 wherein the controller is configured to read a temperature value via the temperature sensor and to provide one or more heating and/or cooling control signals via the I/O block of the thermostat to control one or more components of an HVAC system in order to maintain a desired temperature set point in the building, the controller is further configured to receive two or more request signals for two or more ventilation events from two or more of:
  the one or more wireless ventilation boost control units; and/or
  a user via the user interface of the thermostat;
 each of the two or more request signals indicative of a request for additional ventilation to increase a current ventilation level for a predetermined requested ventilation time or a request for termination of the additional ventilation and is free from a request to change the desired temperature set point in the building and, in response to receiving a request signal for additional ventilation, the controller is configured to send one or more commands to the ventilation controller of the ventilation unit to ventilate the building for a ventilation time, wherein the ventilation time is based, at least in part, on the predetermined requested ventilation time, wherein the controller is further configured to prioritize at least some of the received request signals that are concurrently active and are for additional ventilation based, at least in part, on a remaining time of the predetermined requested ventilation time of each of the prioritized request signals.

2. The thermostat of claim 1, wherein the ventilation unit comprises a blower.

3. The thermostat of claim 1, wherein the controller sends one or more on/off commands to the ventilation controller of the ventilation unit in order to ventilate the building for the ventilation time.

4. The thermostat of claim 1, wherein the controller of the thermostat is configured to override a first request for additional ventilation received via a first ventilation request signal from the one or more wireless ventilation boost control units when a subsequent second request for additional ventilation is received via the user interface of the thermostat while the first request is active.

5. The thermostat of claim 1, wherein the controller of the thermostat is configured to cancel a first request for additional ventilation received via a first ventilation request signal from the one or more wireless ventilation boost control units when a subsequent request for canceling the additional ventilation is received via the user interface of the thermostat while the first request is active.

6. The thermostat of claim 1, wherein prioritizing at least some request signals for different ventilation events is based at least in part on whether the requested ventilation events originate from one of the wireless ventilation boost control units or from a user via the user interface of the thermostat.

* * * * *